US012666147B2

(12) United States Patent
Yokoo

(10) Patent No.:  US 12,666,147 B2
(45) Date of Patent:  Jun. 23, 2026

(54) IMAGE PICKUP APPARATUS AND ITS CONTROL METHOD

(71) Applicant: CANON KABUSHIKI KAISHA, Tokyo (JP)

(72) Inventor: Hideaki Yokoo, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 86 days.

(21) Appl. No.: 18/921,502

(22) Filed: Oct. 21, 2024

(65) Prior Publication Data

US 2025/0142212 A1  May 1, 2025

(30) Foreign Application Priority Data

Oct. 27, 2023  (JP) ................................. 2023-184357

(51) Int. Cl.
| | |
|---|---|
| *H04N 23/67* | (2023.01) |
| *G02B 7/06* | (2021.01) |
| *G02B 7/28* | (2021.01) |
| *H04N 13/204* | (2018.01) |
| *H04N 13/246* | (2018.01) |
| *H04N 13/296* | (2018.01) |
| *H04N 13/361* | (2018.01) |
| *H04N 23/63* | (2023.01) |

(52) U.S. Cl.
CPC ......... *H04N 23/675* (2023.01); *H04N 23/635* (2023.01)

(58) Field of Classification Search
CPC .... H04N 23/67; H04N 23/675; H04N 23/635;
H04N 13/296; H04N 13/204; H04N 13/361; H04N 13/246; G02B 7/06; G02B 7/12; G02B 7/28; G02B 23/18
See application file for complete search history.

(56) References Cited

U.S. PATENT DOCUMENTS

| | | | | |
|---|---|---|---|---|
| 7,251,073 | B2 * | 7/2007 | Kato ........................ | G02B 7/06 |
| | | | | 359/410 |
| 12,546,987 | B2 * | 2/2026 | Ottl .......................... | G02B 7/06 |
| 2003/0095330 | A1 * | 5/2003 | Aikawa .................... | G02B 7/06 |
| | | | | 359/410 |

(Continued)

FOREIGN PATENT DOCUMENTS

| | | |
|---|---|---|
| JP | 2009175498 A | 8/2009 |
| JP | 2012003022 A | 1/2012 |
| JP | 2012113281 A | 6/2012 |

*Primary Examiner* — Marly S Camargo
(74) *Attorney, Agent, or Firm* — Cowan, Liebowitz & Latman, P.C.

(57) ABSTRACT

An image pickup apparatus includes at least one image sensor, a focus detector, a processor configured to perform focus control of each of the first optical system and the second optical system based on the focus state, and an input unit configured to allow a user to input a first target position in an imaging range through the first optical system. The processor is configured to perform focus control of the first optical system according to the focus state at the first target position, set a second target position corresponding to the first target position in an imaging range through the second optical system, perform focus control of the second optical system according to the focus state at the second target position, and notify the user of a completion of the focus control of each of the first optical system and the second optical system.

13 Claims, 9 Drawing Sheets

(56)         References Cited

U.S. PATENT DOCUMENTS

2015/0215611 A1 *   7/2015   Wu ......................... G06T 7/593
                                                345/419
2022/0400208 A1 *  12/2022   Takao .................. H04N 23/635
2024/0214541 A1 *   6/2024   Inoue ................... H04N 23/296

* cited by examiner

IMAGE PICKUP APPARATUS AND ITS CONTROL METHOD

BACKGROUND

Technical Field

The present disclosure relates to an image pickup apparatus configured to perform stereoscopic imaging.

Description of Related Art

As imaging lenses configured to provide stereoscopic imaging, Japanese Patent Laid-Open Nos. 2012-003022 and 2012-113281 disclose two optical systems arranged in parallel, with image circles of the two optical systems formed on a single image sensor. By capturing object images formed by the two optical systems to generate two captured images with parallax, the user can view an image with a stereoscopic effect by observing them with his right and left eyes.

In capturing images using such an imaging lens, each of the two optical systems is to be focused on the same object. Japanese Patent Laid-Open No. 2009-175498 discloses binoculars configured to adjust diopters of the left and right optical systems by moving one of these optical systems, and simultaneous focusing by moving both of these optical systems, wherein and the binoculars include a single operating member configured to switch between these functions.

However, in a configuration in which the diopter adjusting function and the focusing function are switched by operating the single operating member as disclosed in Japanese Patent Laid-Open No. 2009-175498, the operation is complicated and it is difficult to perform fast and accurate focusing.

In addition, autofocus (AF) of each of two optical systems on the same object is to individually set a target position for the AF corresponding to an object position within an imaging range through each optical system, based on the parallax of the optical systems. Moreover, the user may be properly notified of the AF completions of the two optical systems.

SUMMARY

An image pickup apparatus according to one aspect of the disclosure includes at least one image sensor configured to capture two object images formed by a first optical system and a second optical system arranged in parallel, a focus detector configured to detect a focus state using a signal output from the image sensor, a processor configured to perform focus control of each of the first optical system and the second optical system based on the focus state, and an input unit configured to allow a user to input a first target position in an imaging range through the first optical system. The processor is configured to perform focus control of the first optical system according to the focus state at the first target position, set a second target position corresponding to the first target position in an imaging range through the second optical system, perform focus control of the second optical system according to the focus state at the second target position, and notify the user of a completion of the focus control of each of the first optical system and the second optical system. A control method corresponding to the above image pickup apparatus also constitutes another aspect of the disclosure. A storage medium storing a program that causes a computer to execute the above control method also constitutes another aspect of the disclosure.

Further features of various embodiments of the disclosure will become apparent from the following description of embodiments with reference to the attached drawings.

DETAILED DESCRIPTION

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a description will be given of embodiments according to the disclosure.

The image pickup apparatus according to this embodiment is attachable to and detachable from an imaging lens for stereoscopic imaging having a first optical system and a second optical system arranged in parallel at a predetermined distance (base length). The imaging lens may be integrated with the image pickup apparatus.

The first optical system and the second optical system form object images (image circles) as two optical images on a single image sensor provided in the image pickup apparatus. The image pickup apparatus captures these two object images using the image sensor and generates two captured images (a pair of parallax images) having parallax. The captured image for the right eye generated by capturing an image through one of the first and second optical systems and the captured image for the left eye generated by capturing an image through the other optical system are displayed to the right and left eyes of the user via a display apparatus such as a three-dimensional display or VR goggles. The parallax between the captured images for the right and left eyes allows the user to view an image with a stereoscopic effect.

Figure 1:
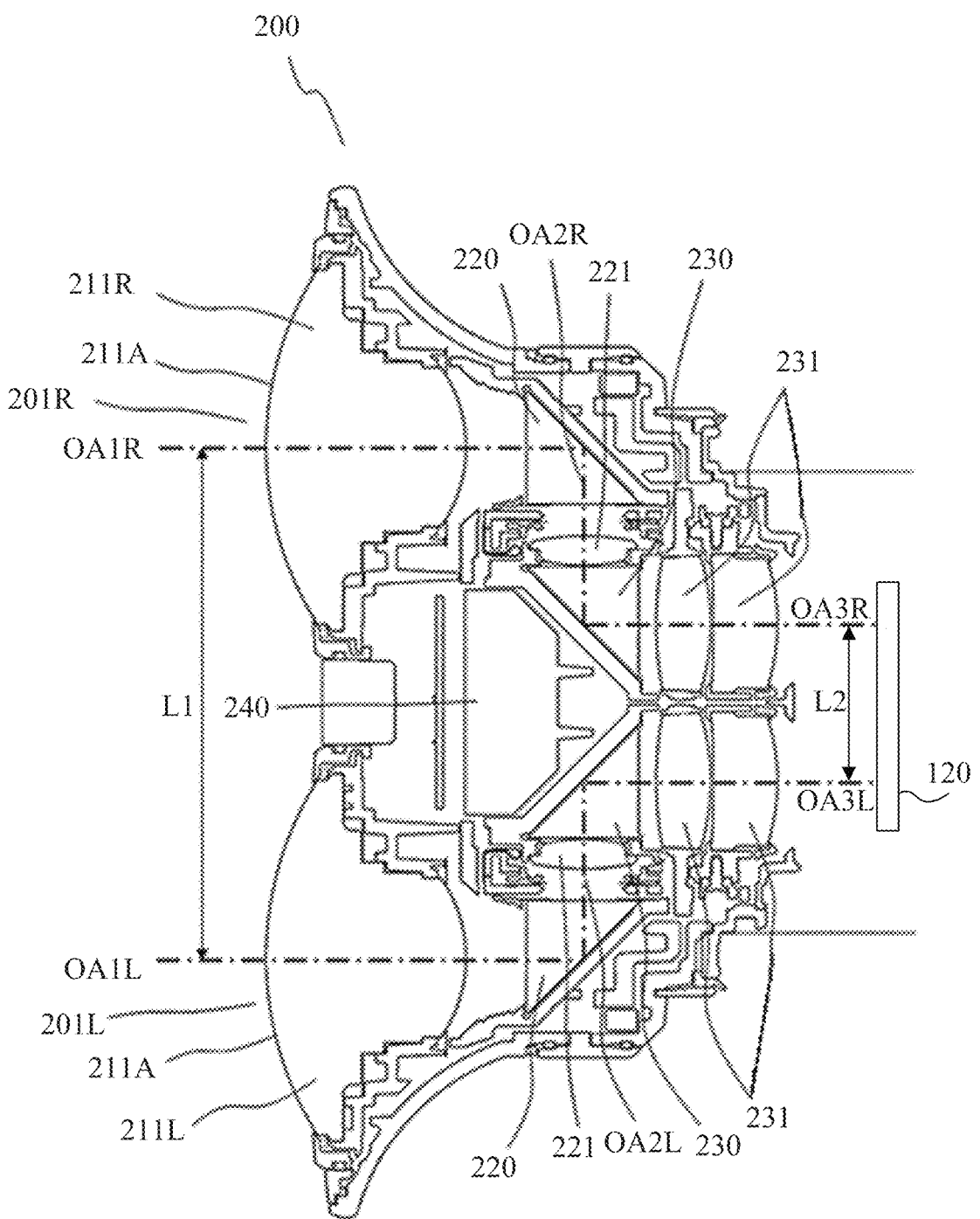
FIG. 1 is a sectional view of a stereoscopic imaging lens for an image pickup apparatus according to this embodiment.

FIG. 1 illustrates the configuration of the imaging lens 200 viewed from above. The imaging lens 200 includes a right-eye optical system 201R as a first optical system and a left-eye optical system 201L as a second optical system. The right-eye optical system 201R and the left-eye optical system 201L are each fixed to a lens top base 240 by screws or the like. The left-eye optical system 201L may be the first optical system and the right-eye optical system 201R may be the second optical system.

In the following description, reference numerals in the description of the right-eye optical system 201R will have R added to the end, and reference numerals in the description of the left-eye optical system 201L will have L added to the end. The R and L will be omitted for reference numerals in the description that are common to both the right-eye optical system 201R and the left-eye optical system 201L.

Each of the right-eye optical system 201R and the left-eye optical system 201L has an effective angle of view of 120° or more. In each optical system, from the object side to the image side, a first optical axis OA1, a second optical axis OA2 perpendicular to the first optical axis OA1 (bent by) 90°, and a third optical axis OA3 perpendicular to the second optical axis OA2 (parallel to the first optical axis OA1) are set. A first lens unit 211 having a lens surface 211A that is convex toward the object side is disposed along the first optical axis OA1, and a second lens unit 221 is disposed along the second optical axis OA2. A third lens unit 231 is disposed along the third optical axis OA3. Each optical system has a first prism 220 that reflects a light beam from the first lens unit 211 and guides it to the second lens unit 221, and a second prism 230 that reflects the light beam from the second lens unit 221 and guides it to the third lens unit 231.

In the following description, the optical axis direction means a direction extending from the object side to the image side, such as the first and third optical axes OA1 and OA3.

Figure 2:
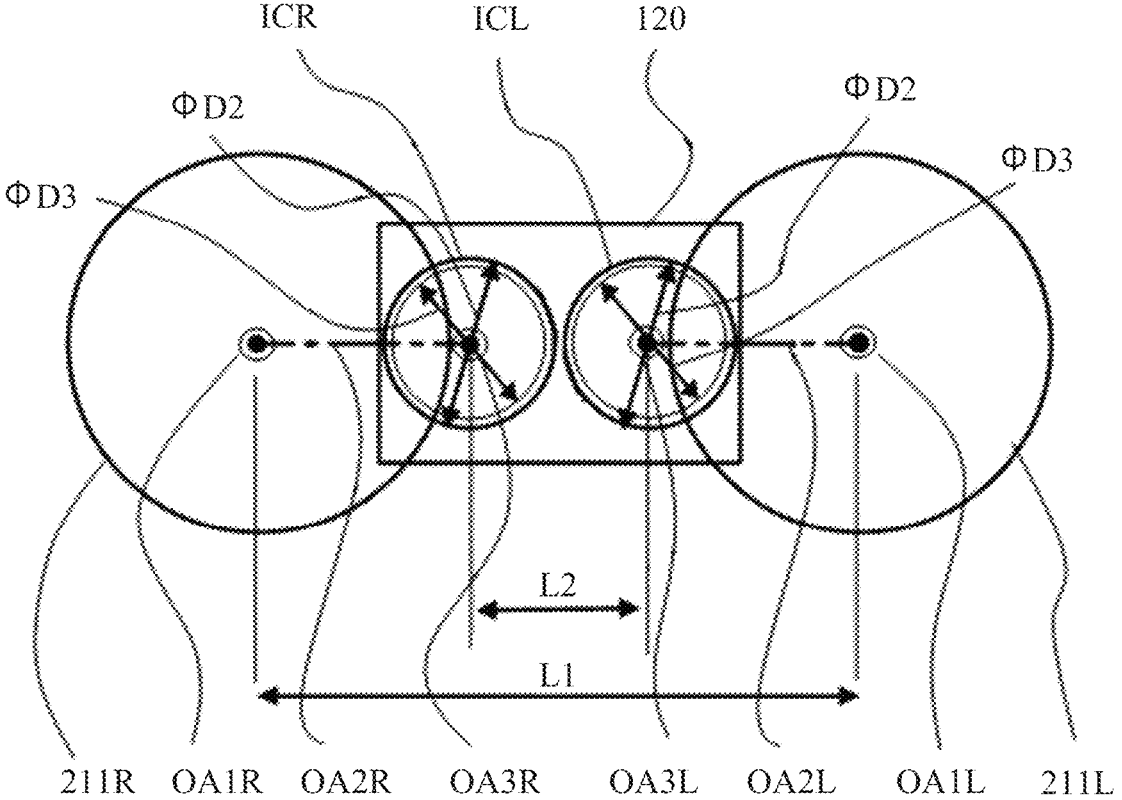
FIG. 2 illustrates the arrangement of the stereoscopic imaging lens and image circles on an image sensor.

FIG. 2 illustrates a relationship between the positions of the first and third optical axes OA1 and OA3 of the right-eye optical system 201R and the left-eye optical system 201L and the positions of image circles ICR and ICL on the image sensor 120 in the image pickup apparatus viewed from the object side.

In the right area (the area on the left side in FIG. 2) of the image sensor 120, the right-eye image circle ICR is formed within its effective angle of view by the right-eye optical system 201R. In the left area (the area on the right side in FIG. 2) of the image sensor 120, the left-eye image circle ICL is formed within its effective angle of view by the left-eye optical system 201L. A diameter ΦD2 of each image circle and a distance between the centers of the image circles ICR and ICL (i.e. a distance between the third optical axes OA3) are set so that the image circles ICR and ICL do not overlap each other.

Each optical system may be configured as a full-circle fisheye lens, and an object image with an angle of view range exceeding 180° may be formed as a circular image on the image sensor 120.

A distance between the first optical axis OA1R of the right-eye optical system 201R and the first optical axis OA1L of the left-eye optical system 201L is the base length L1, and as the base length L1 increases, the stereoscopic effect that the pair of parallax images gives to the user becomes stronger. For example, the size of the image sensor 120 is 24 mm vertical ×36 mm horizontal, the diameter of the image circle is Φ17 mm, a distance L2 between the third optical axes OA3 is 18 mm, and a length of the second optical axis OA2 is 21 mm. In a case where each optical system is disposed so that the second optical axis OA2 extends in the lateral (left-right) direction, the base length L1 illustrated in FIG. 1 is 60 mm, which is approximately equal to the interpupillary width of an adult.

It is said that the angle of view at which a person viewing a pair of parallax images can obtain a stereoscopic effect is about 120°, but since a field of view of 120° tends to leave a discomfort sense, the angle of view is often widened to about 180°. In this embodiment, since the effective angle of view exceeds 180°, a diameter ΦD3 of the image circle in the range of the angle of view of 180° has a relationship: ΦD2>ΦD3.

Example 1

Figure 3:
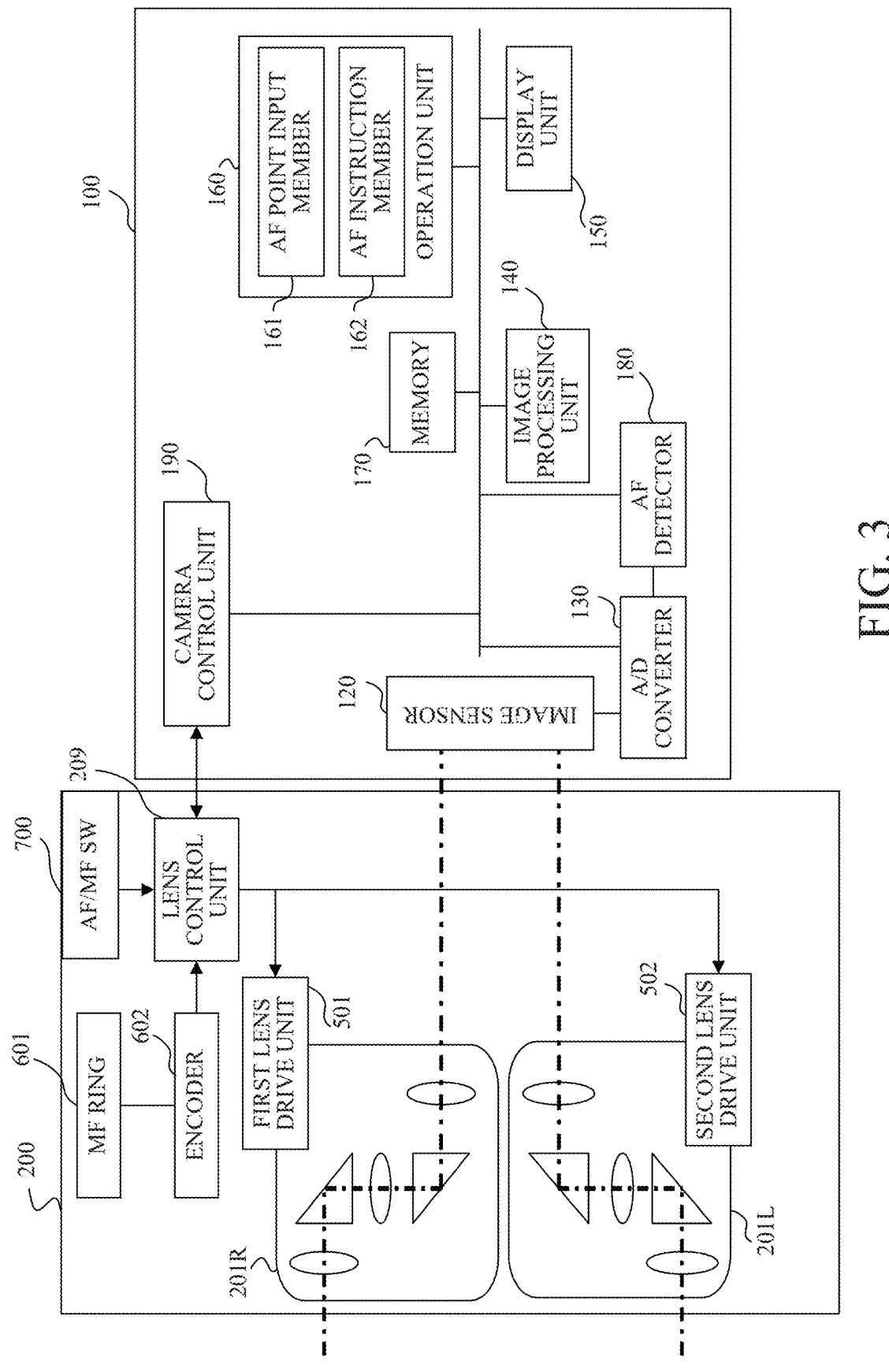
FIG. 3 is a block diagram illustrating the configuration of an image pickup apparatus according to Example 1 mounted with the stereoscopic imaging lens.

FIG. 3 illustrates the configuration of a stereoscopic camera system including an imaging lens 200 and an image pickup apparatus 100 having an image sensor 120. The imaging lens 200 is attached to and detachable from the image pickup apparatus 100 via an unillustrated mount. The imaging lens 200 includes a lens control unit 209, a first lens drive unit 501, a second lens drive unit 502, an manual focus (MF) ring (focus operation member) 601, an encoder 602, and an AF/MF switch 700. The image pickup apparatus 100 includes the image sensor 120, an A/D converter 130, an image processing unit 140, a display unit 150, an operation unit 160, a memory 170, an AF detector 180, and a camera control unit 190.

Each of the lens control unit 209 and the camera control unit 190 includes a computer such as a CPU, and can communicate with each other.

In the imaging lens 200, the first lens drive unit 501 and the second lens drive unit 502 are actuators such as stepping motors or voice coil motors for independently performing focus driving of the right-eye optical system 201R and the left-eye optical system 201L. The first lens drive unit 501 and the second lens drive unit 502 are controlled by the lens control unit 209 that receives a focus command from the camera control unit 190 via communication. Thereby, the right-eye optical system 201R and the left-eye optical system 201L perform independent AF. In the AF, the entire optical system may be moved in the optical axis direction, or the focus lens in each optical system may be moved in the optical axis direction.

A single MF ring 601 is provided for both the right-eye optical system 201R and the left-eye optical system 201L, and is rotated by the user. The encoder 602 detects a rotation amount of the MF ring 601. The lens control unit 209 controls the first lens drive unit 501 and the second lens drive unit 502 according to the rotation amount of the MF ring 601 detected by the encoder 602. Thereby, MF is performed for the right-eye optical system 201R and the left-eye optical system 201L. The specific control in the MF will be described later according to Example 5. The user operation of the AF/MF switch 700 can switch between an AF mode in which AF is performed and an MF mode in which MF is performed in the imaging lens 200.

In the image pickup apparatus 100, the image sensor 120 includes a photoelectric conversion element such as a CMOS sensor, and converts the object images formed by the right-eye optical system 201R and the left-eye optical system 201L into analog electric signals. The A/D converter 130 converts the analog electric signals output from the image sensor 120 into digital electric signals. The image processing unit 140 performs various image processing for the digital electric signals output from the A/D converter 130 to generate a pair of parallax images as image data.

The display unit 150 displays the pair of parallax images and various information regarding imaging. An electronic viewfinder or a liquid crystal panel is used as the display unit 150.

The operation unit 160 has a user interface function that is operable by a user who issues an instruction to the image pickup apparatus 100. In a case where the display unit 150 has a touch panel, the touch panel is also included in the operation unit 160. The operation unit 160 in this example has an AF point input member (input means) 161 and an AF instruction member 162. The AF point input member 161 is operable by the user to select (input) an AF point, which is a target position at which the user wishes to acquire an in-focus state by AF, within the imaging range, which is a range of the angle of view captured through the right-eye optical system 201R. The AF point input member 161 may include a touch panel, a joystick, or the like. The AF instruction member 162 is operable by the user to instruct the AF start at the selected AF point. The AF instruction member 162 may include a touch panel, a button, or the like.

The memory 170 stores various data such as image data output from the image processing unit 140. The memory 170 also stores programs for the camera control unit 190 to operate. The memory 170 includes a ROM, a RAM, a HDD, and the like.

The AF detector 180 detects the focus state on an object (distance) located at the AF point using a signal output from the image sensor 120. In this example, the image sensor 120 has pixels that perform so-called pupil division, and the AF detector 180 detects a phase difference between a pair of image signals output from the pixels, and outputs an AF evaluation value (defocus amount) indicating the focus state corresponding to the phase difference. The camera control unit 190 performs focus control (image-plane phase-difference AF) based on the AF evaluation value.

The AF detector 180 may generate and output an AF evaluation value (contrast evaluation value) corresponding to the focus state from the luminance component of the output signal from the image sensor 120. In this case, the camera control unit 190 performs focus control (contrast AF) so that the AF evaluation value becomes maximum.

The camera control unit 190 controls the entire camera system consisting of the image pickup apparatus 100 and the imaging lens 200. The camera control unit 190 selects the lens drive unit (501 or 502) and the drive amount to be controlled based on the position information on the selected AF point and the focus state detected by the AF detector 180, triggered by an AF start instruction via the AF instruction member 162.

Figure 4:
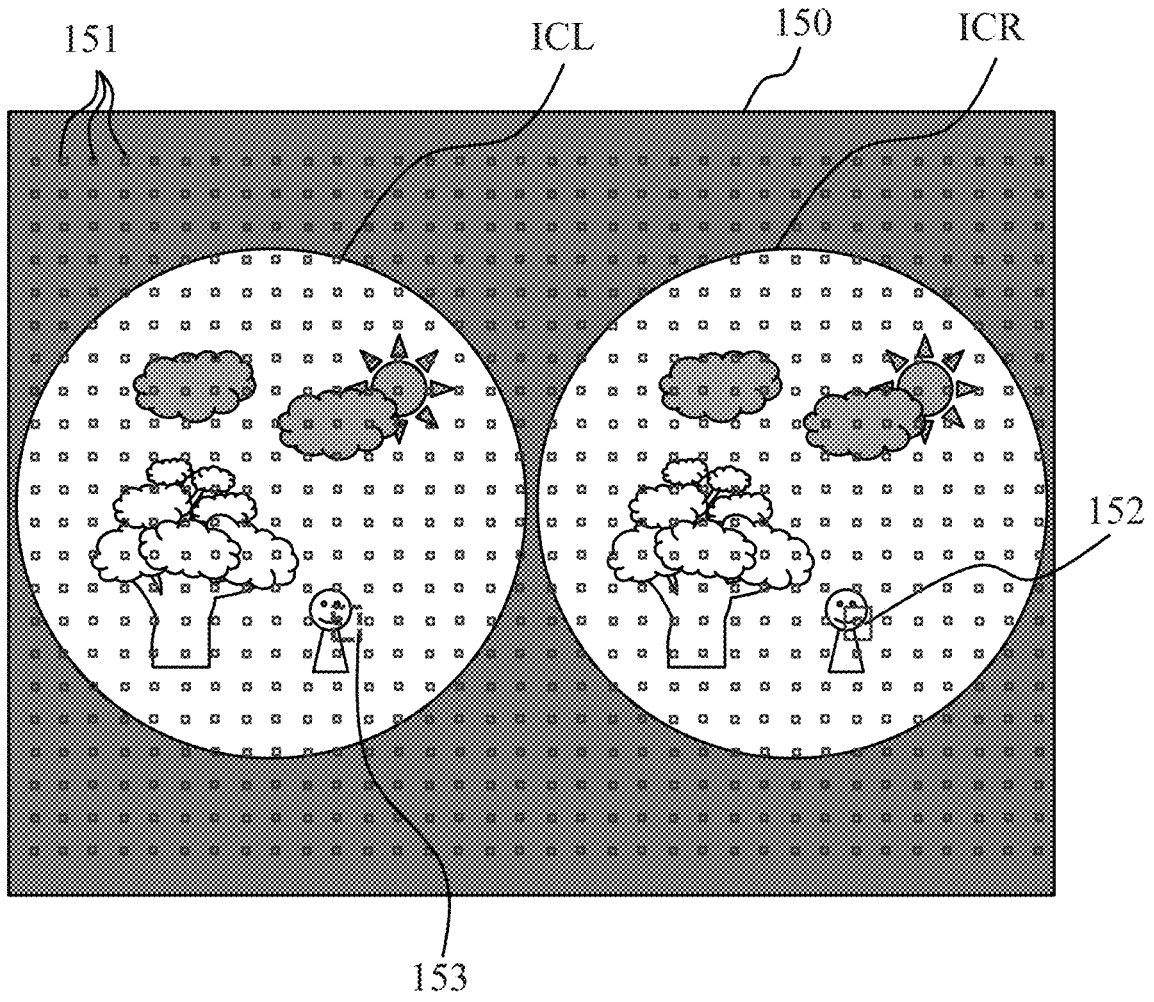
FIG. 4 illustrates the display of parallax images.

FIG. 4 illustrates an example of a pair of parallax images displayed on the display unit 150. In the right area of the display unit 150, a captured image for the right eye (first captured image: referred to as a right-eye image hereinafter) corresponding to the right-eye image circle ICR formed by the right-eye optical system 201R is displayed. In the left area of the display unit 150, a captured image for the left eye (second captured image: referred to as a left-eye image hereinafter) corresponding to the left-eye image circle ICL formed by the left-eye optical system 201L is displayed. A plurality of AF points 151 are displayed in a row and column on the entire display unit 150.

On the captured image for the right eye (within the imaging range), a first AF frame 152 for displaying a first AF point (first target position) selected by the user through the AF point input member 161 is displayed so as to include the first AF point. This first AF point is an AF point for the right-eye optical system 201R. In this example, in a case where the user instructs the AF start in this state through the AF instruction member 162, the AF of the right-eye optical system 201R is started.

On the captured image for the left eye (within the imaging range), a second AF frame 153 for displaying a second AF point (second target position) set by the camera control unit 190 as the AF point for the left-eye optical system 201L corresponding to the first AF point in the AF processing described later is illustrated by a dashed line. An object located at the second AF point is the same object as the object located at the first AF point. In the AF processing described later, the second AF frame 153 is not displayed until AF of the right-eye optical system 201R is completed, and after the AF is completed, the second AF frame 153 is displayed and AF of the left-eye optical system 201L is performed.

The image pickup apparatus 100 according to this example can switch between a normal display mode in which a captured image is displayed in a normal size as illustrated in FIG. 4 and an enlarged display mode. In the enlarged display mode, an image area near an AF point selected in the normal display mode is enlarged and displayed on the display unit 150. Switching between the normal mode and the enlarged display mode can be achieved by operating an unillustrated display mode switch provided on the operation unit 160.

Figure 5:
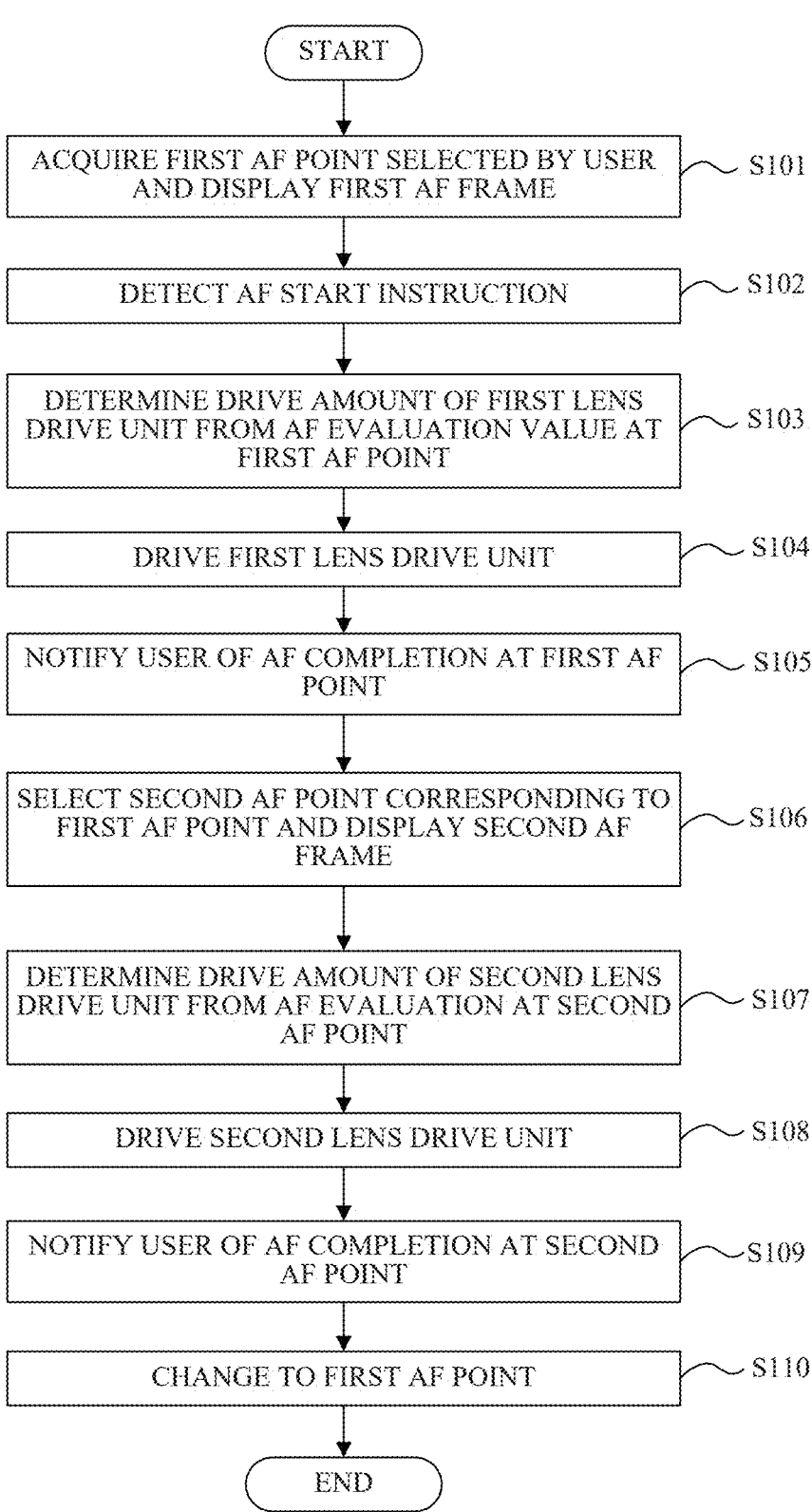
FIG. 5 is a flowchart illustrating AF processing according to Example 1.

The flowchart in FIG. 5 illustrates the AF processing executed by the camera control unit 190 according to a program.

In step S101, the camera control unit 190 acquires information on the position of the first AF point selected through the AF point input member 161. Then, the first AF frame 152 enclosing the first AF point is displayed on the right-eye image of the display unit 150.

Next, in step S102, the camera control unit 190 detects an AF start instruction from the AF instruction member 162.

Next, in step S103, the camera control unit 190 acquires an AF evaluation value at the first AF point from the AF detector 180, and determines a drive amount of the first lens drive unit 501 from the AF evaluation value.

Next, in step S104, the camera control unit 190 controls the first lens drive unit 501 according to the determined drive amount. Thereby, an in-focus state can be obtained in the right-eye optical system 201R, and AF of the right-eye optical system 201R is completed.

Next, in step S105, the camera control unit 190 notifies the user that AF of the right-eye optical system 201R is completed. More specifically, the camera control unit 190 notifies the user by flashing or changing the color of the first AF frame 152, or by sound or vibration.

Next, in step S106, the camera control unit 190 selects (sets) a second AF point for the left-eye optical system 201L corresponding to the first AF point. More specifically, a parallax amount of the left-eye optical system 201L relative to the right-eye optical system 201R is calculated based on the position information on the first AF point, the focal lengths of the right-eye optical system 201R and the left-eye optical system 201L, the base length L1, the AF evaluation value acquired from the AF detector 180, and the like. Then, a position shifted from the first AF point by the parallax amount is set as the second AF point. Thereby, an AF point on the same object as the object located at the first AF point is selected as the second AF point.

In place of the AF detector 180, an object detector may be provided that performs image processing to identify an object such as a person's face from a captured image. In this case, the object detector is caused to recognize the object located at the first AF point in the right-eye image, and to detect the same object in the left-eye image. The camera control unit 190 sets the AF point on the detected object as the second AF point.

The camera control unit 190 that has selected the second AF point displays a second AF frame 153 enclosing the second AF point on the left-eye image on the display unit 150.

Next, in step S107, the camera control unit 190 acquires an AF evaluation value at the second AF point from the AF detector 180, and determines a drive amount of the second lens drive unit 502 from the AF evaluation value.

Next, in step S108, the camera control unit 190 controls the second lens drive unit 502 in accordance with the determined drive amount. Thereby, an in-focus state is obtained in the left-eye optical system 201L as well, and AF of the left-eye optical system 201L is completed.

Next, in step S109, the camera control unit 190 notifies the user that AF of the left-eye optical system 201L has been completed. More specifically, the second AF frame 153 flashes, changes color, and notifies the user by sound or vibration.

Next, in step S110, the camera control unit 190 changes the AF point for AF to the first AF point again, and displays the first AF frame 152 on the right-eye image on the display unit 150. Then, this flow ends.

According to the above processing, in a case where the first AF point for the right-eye optical system 201R is input by the user, the second AF point for the left-eye optical system 201L is automatically set, so that AF can be easily performed on the same object in the right-eye optical system 201R and the left-eye optical system 201L. In addition, the user is notified of each of the AF completion for the right-eye optical system 201R and the AF completion for the left-eye optical system 201L, so that the user can obtain a pair of parallax images that provide a good stereoscopic effect after the user receives the notification and starts imaging. Moreover, by performing AF for each optical system, power consumption per unit time can be reduced.

In this example, AF of the left-eye optical system 201L is performed at the second AF point after AF of the right-eye optical system 201R is performed at the selected first AF point, but AF of the right-eye optical system 201R at the first AF point may be performed after AF of the left-eye optical system 201L is performed at the selected second AF point.

Example 2

Figure 6:
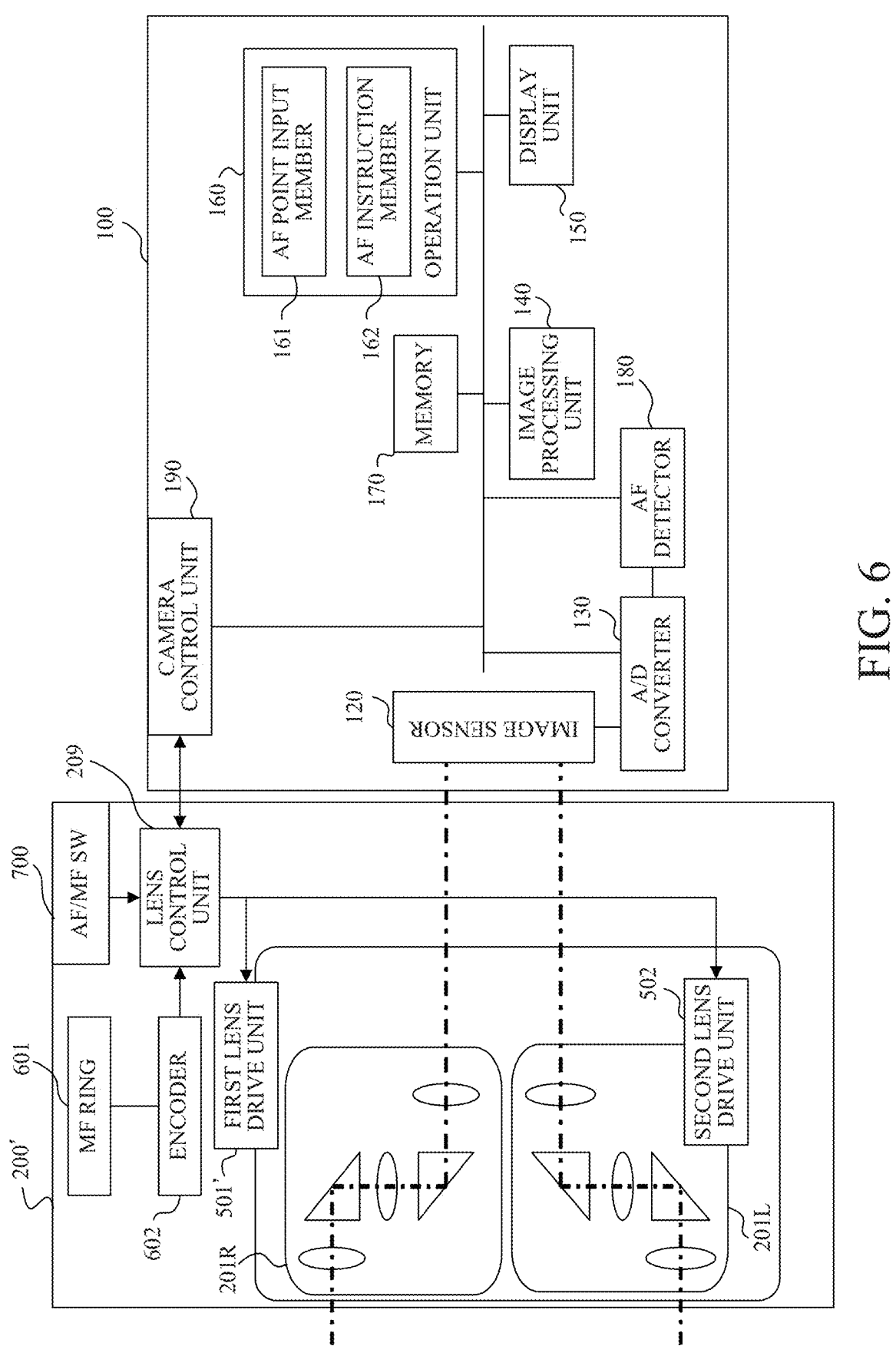
FIG. 6 is a block diagram illustrating the configuration of an image pickup apparatus according to Example 2 mounted with a stereoscopic imaging lens.

A description will now be given of Example 2. FIG. 6 illustrates the configuration of a stereoscopic camera system including an imaging lens 200' and the same image pickup apparatus 100 as that of Example 1. In the imaging lens 200', a first lens drive unit 501' integrally drives the right-eye optical system 201R and the left-eye optical system 201L as a whole or the focus lenses included in them. A second lens drive unit 502 drives the left-eye optical system 201L as a whole or the focus lens included in it. At this time, a drive amount of the first lens drive unit 501' is calculated from the AF evaluation value at the first AF point.

This example can perform the AF processing illustrated in FIG. 5.

Example 3

Figure 7:
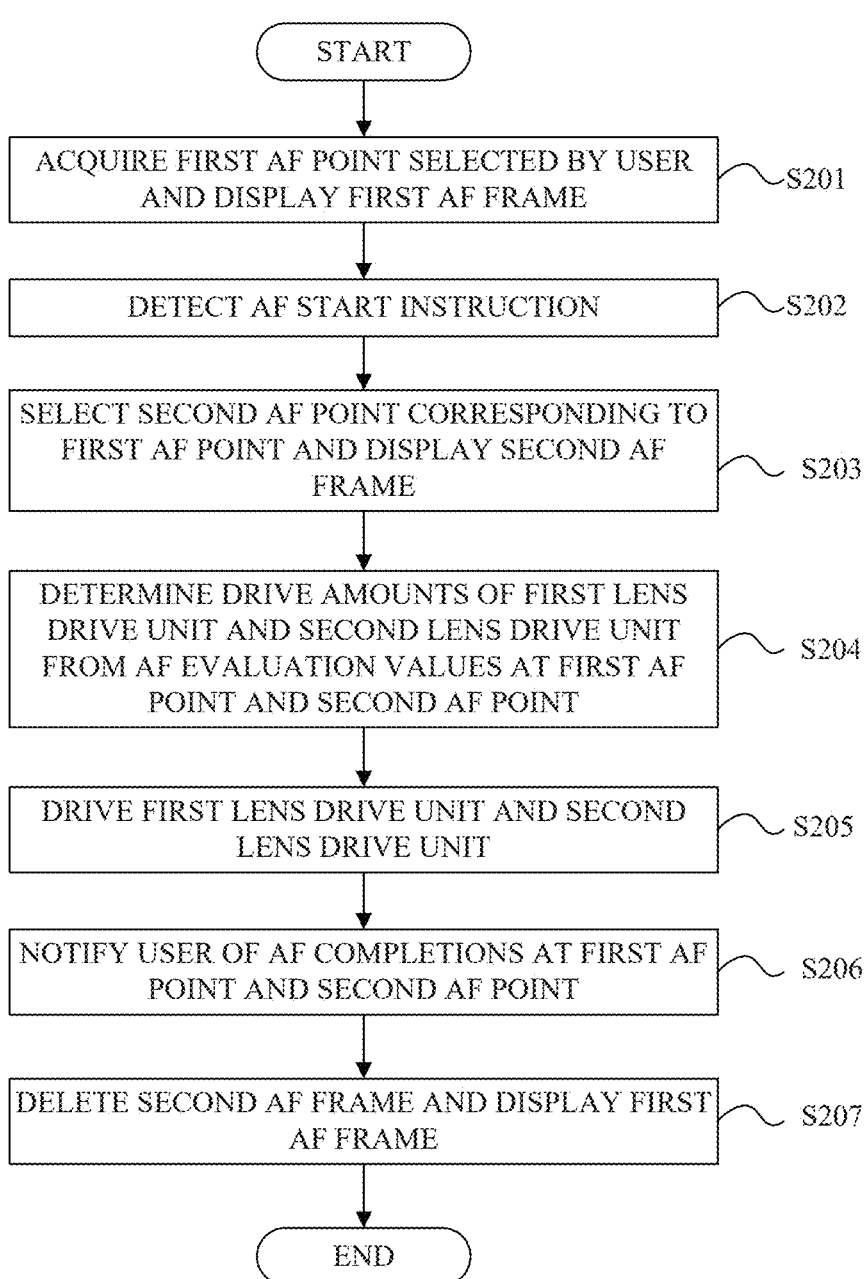
FIG. 7 is a flowchart illustrating AF processing according to Example 3.

A description will now be given of Example 3. A flow-chart in FIG. 7 illustrates AF processing executed by the camera control unit 190 through a program according to Example 3. The configuration of the camera system in this example is the same as that of Example 1. The AF process-ing according to this example may also be performed in the camera system according to Example 2.

In step S201, the camera control unit 190 acquires infor-mation on the position of the first AF point selected through the AF point input member 161. Then, the first AF frame 152 enclosing the first AF point is displayed on the right-eye image on the display unit 150.

Next, in step S202, the camera control unit 190 detects an AF start instruction from the AF instruction member 162.

Next, in step S203, the camera control unit 190 selects (calculates) a second AF point for the left-eye optical system 201L that corresponds to the first AF point. The second AF point is selected by the same method as described in step S106 in Example 1 (FIG. 5). The camera control unit 190 that has selected the second AF point displays a second AF frame 153 enclosing the second AF point on the left-eye image on the display unit 150.

Next, in step S204, the camera control unit 190 acquires AF evaluation values at the first AF point and the second AF point from the AF detector 180, and determines the drive amounts of the first lens drive unit 501 and the second lens drive unit 502 from these AF evaluation values.

Next, in step S205, the camera control unit 190 controls the first lens drive unit 501 and the second lens drive unit 502 according to the determined drive amounts. As a result, an in-focus state is obtained in each of the right-eye optical system 201R and the left-eye optical system 201L, and AF of the right-eye optical system 201R and AF of the left-eye optical system 201L are completed.

Next, in step S206, the camera control unit 190 notifies the user that AF of the right-eye optical system 201R and AF of the left-eye optical system 201L is completed. More specifically, the first AF frame 152 and the second AF frame 153 flash or change the color, or further notify by sound or vibration.

Next, in step S207, the camera control unit 190 deletes the display of the second AF frame 153 from the display unit 150. Thereby, only the first AF point 152 is displayed.

Even in this example, once the first AF point for the right-eye optical system 201R is input by the user, the second AF point for the left-eye optical system 201L is automatically set, so that AFs can be easily performed on the same object in the right-eye optical system 201R and the left-eye optical system 201L. In addition, the user is notified of the AF completions in the right-eye optical system 201R and the left-eye optical system 201L, so that the user can obtain a pair of parallax images that provide a good stereo-scopic effect by starting imaging upon receiving the notification. In this example, AFs are performed simultaneously in the right-eye optical system 201R and the left-eye optical system 201L, so the time required to complete the AFs in the right-eye optical system 201R and the left-eye optical system 201L can be shorter than that of Example 1.

Example 4

Figure 8:
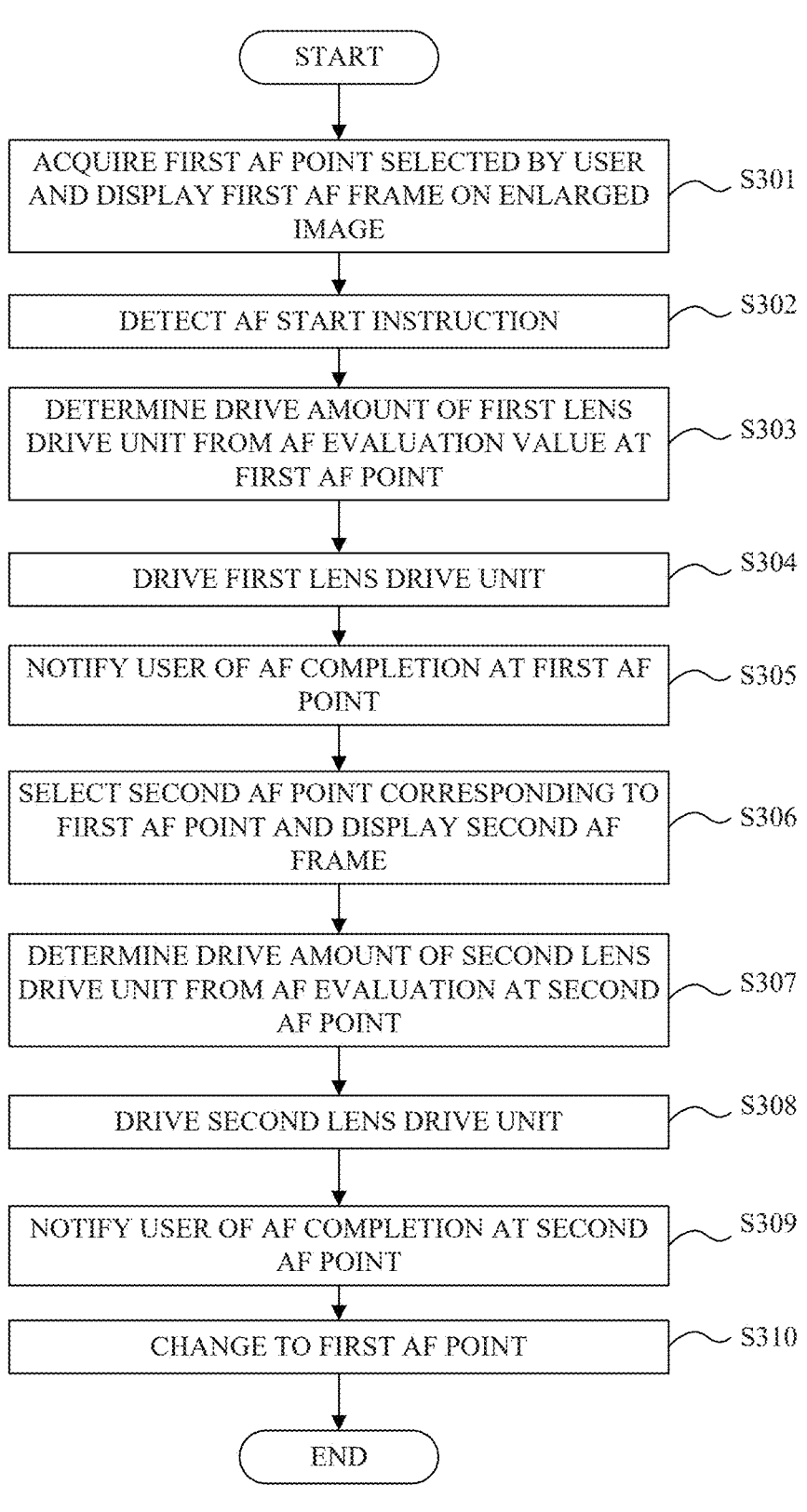
FIG. 8 is a flowchart illustrating AF processing according to Example 4.

A description will now be given of Example 4. A flowchart in FIG. 8 illustrates AF processing according to Example 4. This example will discuss the AF processing in a case where the enlarged display mode is selected by the user.

In step S301, the camera control unit 190 acquires information on the position of the first AF point selected through the AF point input member 161. Then, the camera control unit 190 causes the display unit 150 to display an enlarged image of a portion of the right-eye image near the first AF point, and a first AF frame 152 enclosing the first AF point on the enlarged image. The user can also perform fine adjustments for the first AF point by viewing the first AF frame 152 displayed on the enlarged image.

The processing of steps S302 to S305 is the same as the processing of steps S102 to S105 in Example 1 (FIG. 5).

Next, in step S306, the camera control unit 190 selects (calculates) a second AF point for the left-eye optical system 201L that corresponds to the first AF point. The second AF point is selected in the same manner as described in step S106 according to Example 1 (FIG. 5). The camera control unit 190 that has selected the second AF point causes the display unit 150 to display an enlarged image of the portion of the left-eye image near the second AF point, and a second AF frame 153 enclosing the second AF point on the enlarged image.

Steps S307 to S310 are the same as steps S107 to S110 in Example 1 (FIG. 5).

This example displays the first AF point and the second AF point on the enlarged images of the right-eye image and the left-eye image, respectively, and enables the user to easily confirm which part of the object the first AF point and the second AF point are located in (such as the right eye of a person's face rather than the nose).

Even in this example, similarly to Example 1, AF of the right-eye optical system 201R at the first AF point may be performed after AF of the left-eye optical system 201L is performed at the selected second AF point.

Example 5

Figure 9:
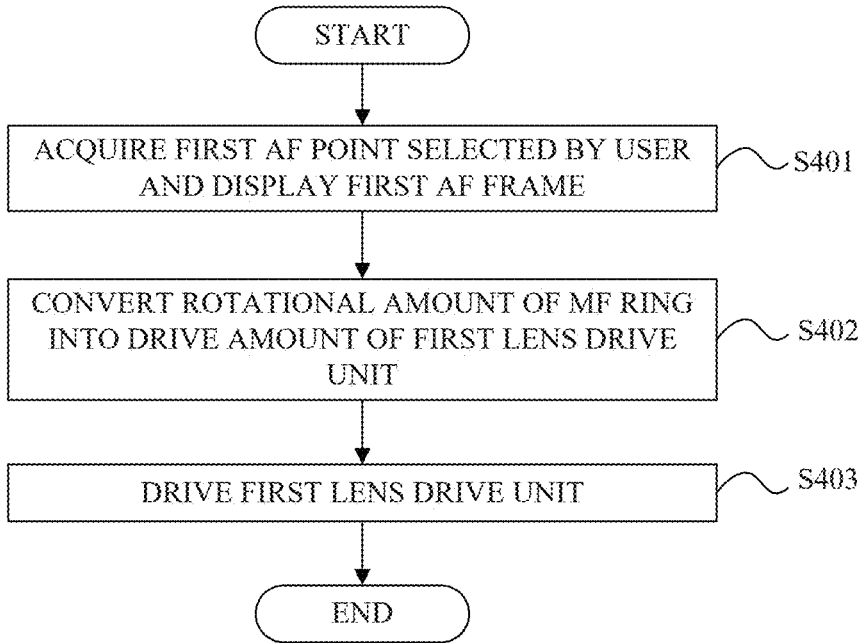
FIG. 9 is a flowchart illustrating MF processing according to Example 5.

A description will now be given of Example 5. A flowchart in FIG. 9 illustrates MF processing according to Example 5. This example will discuss the processing in a case where the MF mode is selected by the user.

In step S401, in a case where the first AF point is selected via the AF point input member 161, the camera control unit 190 causes the display unit 150 to display the first AF frame 152 enclosing the first AF point on the right-eye image, and starts MF processing of the right-eye optical system 201R.

In step S402 in the MF processing, in a case where the rotation of the MF ring 601 is detected by the encoder 602 via the lens control unit 209, the camera control unit 190 converts a rotation amount of the MF ring 601 detected by the encoder 602 into a drive amount of the first lens drive unit 501.

In step S403, the camera control unit 190 controls the first lens drive unit 501 in accordance with the converted drive amount. Thereby, MF control of the right-eye optical system 201R is performed.

Although not illustrated in FIG. 9, in a case where the second AF point is subsequently selected by the user via the AF point input member 161, the camera control unit 190 causes the left-eye optical system 201L to perform MF processing.

In this way, in MF mode, MF of the right-eye optical system 201R is performed according to the operation of the MF ring 601 and the input of the first AF point via the AF point input member 161, and MF of the left-eye optical system 201L is performed according to the same operation of the MF ring 601 and the input of the second AF point via the AF point input member 161. Thereby, MFs of the right-eye optical system 201R and the left-eye optical system 201L can be performed by the operation of the single MF ring 601.

The following processing may be performed after step S403. In step S404, in a case where the camera control unit 190 detects the MF completion of the right-eye optical system 201R by the user operation on the operation unit 160, it calculates a distance at which the right-eye optical system 201R is in focus based on the focal length and focus drive position of the right-eye optical system 201R (or detects the in-focus object). Then, it calculates the drive amount of the second lens drive unit 502 for the left-eye optical system 201L to focus on that distance (or object), and controls the second lens drive unit 502 according to that drive amount. Thereby, the in-focus state of the left-eye optical system 201L can be obtained, and AF of the left-eye optical system 201L according to the MF of the right-eye optical system 201R can be completed.

Next, in step S405, the camera control unit 190 notifies the user of the AF completion of the left-eye optical system 201L by sound, vibration, etc. Then, this flow ends.

This example performs AF of the left-eye optical system 201L according to the MF of the right-eye optical system 201R, and thus the right-eye optical system 201R and the left-eye optical system 201L can easily be in focus on an object that the user wishes to focus on using MF. The user can be clearly notified of the AF completion of the left-eye optical system 201L after the MF of the right-eye optical system 201R is completed.

AF of the right-eye optical system 201R may be performed after MF of the left-eye optical system 201L is completed.

The AF processing described in Examples 1 to 4 and the MF processing described in Example 5 can be performed even in a case where the image pickup apparatus includes an image sensor for capturing an object image formed by the first optical system and another image sensor for capturing an object image formed by the second optical system. The AF processing and MF processing in each example can be performed not only when the first optical system and the second optical system are optical systems that bend the optical axes, but also when the first optical system and the second optical system are both coaxial optical systems whose optical axes extend in a straight line from the object side to the image side.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

The present disclosure can easily perform AF suitable for stereoscopic imaging of two optical systems, and the user can be properly notified of AF completion.

This application claims priority to Japanese Patent Application No. 2023-184357, which was filed on Oct. 27, 2023, and which is hereby incorporated by reference herein in its entirety.

What is claimed is:

1. An image pickup apparatus comprising:
at least one image sensor configured to capture two object images formed by a first optical system and a second optical system arranged in parallel;
a focus detector configured to detect a focus state using a signal output from the image sensor;
a processor configured to perform focus control of each of the first optical system and the second optical system based on the focus state; and
an input unit configured to allow a user to input a first target position in an imaging range through the first optical system,
wherein the processor is configured to:
perform focus control of the first optical system according to the focus state at the first target position,
set a second target position corresponding to the first target position in an imaging range through the second optical system,
perform focus control of the second optical system according to the focus state at the second target position, and
notify the user of a completion of the focus control of each of the first optical system and the second optical system.

2. The image pickup apparatus according to claim 1, wherein the processor is configured to set the second target position for the same object as an object for which the first target position is set.

3. The image pickup apparatus according to claim 1, wherein the processor is configured to perform the focus control of the first optical system, a notification of a completion of the focus control of the first optical system, the focus control of the second optical system, and a notification of completion of the focus control of the second optical system in this order.

4. The image pickup apparatus according to claim 1, wherein the processor is configured to perform the focus control of each of the first optical system and the second optical system, and a notification of completions of the focus controls of the first optical system and the second optical system in this order.

5. The image pickup apparatus according to claim 1, further comprising a display unit configured to display a first captured image obtained by imaging through the first optical system and a second captured image obtained by imaging through the second optical system,
wherein the processor is configured to:
perform the focus control of the first optical system by displaying the first target position on the first captured image, and
perform the focus control of the second optical system by displaying the second target position on the second captured image after the focus control of the first optical system is completed.

6. The image pickup apparatus according to claim 5, wherein the processor is configured to:
cause the display unit to display an enlarged image of a portion of the first captured image that includes the first target position, and
cause the display unit to display an enlarged image of a portion of the second captured image that includes the second target position.

7. The image pickup apparatus according to claim 4, further comprising a display unit configured to display a first captured image obtained by imaging through the first optical system and a second captured image obtained by imaging through the second optical system,
wherein the processor is configured to perform the focus control of the first optical system by displaying the first target position on the first captured image and the focus control of the second optical system by displaying the second target position on the second captured image.

8. The image pickup apparatus according to claim 4, wherein the processor is configured to control a first drive unit configured to drive the first optical system in the focus control of the first optical system and a second drive unit configured to drive the second optical system in the focus control of the second optical system.

9. The image pickup apparatus according to claim 1, wherein the processor is configured to control a first drive unit configured to drive the first optical system and the second optical system and a second drive unit configured to drive the second optical system in the focus control of each of the first optical system and the second optical system.

10. The image pickup apparatus according to claim 1, wherein focus controls of the first optical system and the second optical system, and manual focuses of the first optical system and the second optical system can be switched, and
wherein in the manual focuses, the processor is configured to:
control the first optical system according to an operation of a focus operation member according to an input of the first target position through the input unit, and
control the second optical system according to an operation of the focus operation member according to an input of the second target position through the input unit.

11. The image pickup apparatus according to claim 1, wherein the focus control of the first optical system and manual focus of the first optical system can be switched, and wherein the processor is configured to set the second target position and perform the focus control of the second optical system after the manual focus of the first optical system according to an input of the first target position and an operation of the focus operation member are completed.

12. A control method for an image pickup apparatus that includes an image sensor configured to capture two object images formed by a first optical system and a second optical system arranged in parallel, and detects a focus state using a signal output from the image sensor, the control method comprising the steps of:

causing a user to input a first target position within an imaging range through the first optical system;

performing focus control of the first optical system according to the focus state at the first target position;

setting a second target position corresponding to the first target position within an imaging range through the second optical system;

performing focus control of the second optical system according to the focus state at the second target position; and notifying a user of completions of focus controls of the first optical system and the second optical system.

13. A non-transitory computer-readable storage medium storing a program that causes a computer to execute the control method of claim 12.

* * * * *